United States Patent [19]

McCurdy et al.

[11] 4,383,972
[45] May 17, 1983

[54] APPARATUS FOR THE MULTIPLE STAGE DEVOLATILIZATION OF MASS PROCESSABLE POLYMERS

[75] Inventors: J. L. McCurdy, Corona Del Mar; Marvin A. Jarvis, Walnut, both of Calif.

[73] Assignee: Polymer Research, Inc., Big Spring, Tex.

[21] Appl. No.: 283,405

[22] Filed: Jul. 15, 1981

Related U.S. Application Data

[62] Division of Ser. No. 25,736, Mar. 30, 1979, abandoned.

[51] Int. Cl.³ .......................... C08F 6/06; B01J 12/02
[52] U.S. Cl. .................................... 422/131; 202/173; 202/205; 528/501
[58] Field of Search ................ 528/501; 422/131, 132, 422/135, 137, 138; 159/2 R, 2 E, 2 MS, DIG. 10; 202/173, 205; 203/88

[56] References Cited

U.S. PATENT DOCUMENTS

| | | | |
|---|---|---|---|
| 3,072,626 | 1/1963 | Cines | 528/501 |
| 3,242,969 | 3/1966 | Kiguchi | 159/DIG. 10 |
| 3,668,161 | 6/1972 | Nauman | 528/501 |
| 3,853,672 | 12/1974 | Gordon et al. | 159/2 MS |
| 3,884,766 | 5/1975 | Bir et al. | 202/173 |
| 3,927,983 | 12/1975 | Gordon et al. | 422/135 |
| 4,017,498 | 4/1977 | Hopkins | 422/132 |

Primary Examiner—Michael S. Marcus

[57] ABSTRACT

Disclosed is a multiple-stage flash devolatilization process, and apparatus for use therein, for recovering volatiles from mass processable polymers, which enables optimally low pressures to be employed without the necessity for refrigeration to condense the volatiles recovered thereby, comprising separating the volatiles from the polymeric material by flashing in a first flash devolatilization zone to remove the majority of the volatiles and then flashing in at least one additional flash devolatilization zone maintained at a lower pressure, preferably as low as practically possible, to remove residual volatiles, and then recovering the volatiles for further use by feeding the volatiles recovered from the additional flash zones back into the first flash zone, the higher pressure of which allows the combined free volatiles present therein to then be condensed in a conventional non-refrigeration cooling process.

9 Claims, 1 Drawing Figure

APPARATUS FOR THE MULTIPLE STAGE DEVOLATILIZATION OF MASS PROCESSABLE POLYMERS This is a division of application Ser. No. 25,736, filed Mar. 30, 1979, now abandoned.

BACKGROUND OF THE INVENTION

The present invention relates to a process for the removal of volatile constituents from polymers. More particularly, the present invention relates to a multiple-stage flash devolatilization process for removing and recovering volatiles from polymers, especially mass processable polymers, which enables optimally low pressures to be employed without the necessity for refrigeration to condense the volatile constituents recovered thereby.

In the preparation of polymeric materials, particularly the mass processable polymers, considerable amounts of unreacted monomer and low molecular weight polymers, such as dimer and trimers, remain admixed or entrained in the polymer product. Due to the considerable difficulty in polymerizing a polymerization mixture to absolute completion, complete polymerization of all the available monomer has been found to be impractical on a commercial basis. Moreover, polymerization of the final portion of available monomer has been found to have a deleterious effect on polymer product quality, resulting in the production of undesirable low molecular weight polymer. Additionally, it is also common practice to employ various inert solvents and other agents during the polymerization process in order to achieve certain results in the operating conditions and in the characteristics of the polymer product. The presence of such solvents as contaminants in the final polymer product has an adverse effect on the polymer properties, tending to cause crazing in the polymer, decreased heat distortion temperature, and increased odor. Additionally, the volatile or fugacious constituents of the polymeric material are susceptible to leaching, precluding use of the polymer product in conjunction with foods, for example, as for packaging containers and the like. Accordingly, it is common practice in the art to subject the polymeric materials to a devolatilization step in which a stream of hot polymer product is exposed to reduced pressure in order to vaporize and remove the volatile components from the polymer product.

In order to produce the highest quality product, it is desirable to reduce the residual volatile level of the finished polymer to as low a level as possible. For many commercial applications, such as, food packaging, Federal regulations furthermore require that the finished polymer product be substantially free of volatile constituents. Maximum volatiles content can be as low as a few parts per million by weight volatiles. To this end, the prior art has developed many devolatilization processes for reducing the volatiles content of polymeric materials, and particularly for reducing the volatiles content of mass processable polymers. Representative examples of these processes include the devolatilization processes of U.S. Pat. Nos. 2,941,985; 3,311,076; and 3,668,161. The first and last, in particular, teach that devolatilization may be enhanced through the use of a multiple-stage flash devolatilization process in which the polymeric material is subjected to successively lower pressures.

U.S. Pat. No. 3,073,812 teaches a process wherein ethylene and propylene polymers are precipitated from solution in a three-stage flash cooling process. Such a process, however, is unsuitable for use in the devolatilization of mass processable polymers, such as styrene polymers and copolymers, since the low temperatures used therein preclude reduction of the volatiles content of the polymer to desirable levels. Similarly, U.S. Pat. No. 3,280,091 teaches a process for recovering unreacted propylene from a polypropylene polymer solution by a two-stage flash devolatilization combined with a subsequent monomer stripping step. The process of this patent is likewise unsuitable for use in the devolatilization of mass processable polymers since a solvent stripping step subsequent to flashing re-contaminates the polymeric material with a volatile solvent contaminant.

In order to reduce the volatiles content of a polymeric material to successively lower levels, it is necessary to expose the polymeric material to increasingly lower vacuum. As the pressure in the flash devolatilization zones is decreased to the ultimately low pressures necessary to substantially completely remove the volatiles from the polymeric material, refrigeration of the volatiles condenser becomes necessary. Actually you cannot operate in any practical way without condensation for your vacuum producing equipment would have to be large enough to pass all vapor at the reduced pressure, a mind-bogging volume. Heretofore, therefore, the prior art has required the use of a refrigerated condenser on the second stage low pressure flash devolatilization zone in a multiple-stage devolatilization process. In U.S. Pat. No. 2,941,985, for example, the majority of the volatiles are removed in a first relatively higher pressure flash devolatilization zone, and the residual volatiles are removed in a second optimally low pressure devolatilization zone. However, the requirement for expensive refrigeration to condense the volatiles in the above processes renders their use undesirable on a commercial basis. Accordingly, there exists a need for a process for the devolatilization of polymers, particularly mass processable polymers, which can achieve substantially complete removal of the volatile constituents from the polymeric material without the necessity for refrigeration.

SUMMARY OF THE INVENTION

Accordingly, it is an object of the instant invention to provide a process for substantially completely removing volatile constituents from mass processable polymers which eliminates the necessity for refrigeration to condense the volatiles separated thereby.

It is an additional object of the instant invention to provide a high efficiency process for the devolatilization of mass processable polymers, which eliminates the necessity for refrigeration on the volatiles condenser and which can reduce the volatiles content of the polymeric material to less than about 0.1% by weight.

Yet another object of the instant invention is the provision of a devolatilization process for mass processable polymers which enables the use of extremely low pressures without the necessity for refrigeration on the volatiles condenser.

It is a specific object of the present invention to provide a multiple-stage devolatilization process for mass processable polymers in which the majority of the volatile constituents are removed in a first flash devolatilization zone, and the residual volatiles are removed in at least one additional flash devolatilization zone which is maintained at the ultimately low pressures necessary for substantially complete volatile removal, which eliminates the necessity for refrigeration to condense the volatiles removed in the ultimately low pressure devolatilization zones.

Another object of the present invention is the provision of a high efficiency devolatilization apparatus for polymeric materials polymerizable in mass form which eliminates the necessity for refrigeration to condense the volatiles recovered thereby.

In accomplishing the foregoing, and other objects, there has been provided in accordance with the present invention a flash devolatilization process for recovering volatiles from polymers, which enables optimally low pressures to be employed without the necessity for refrigeration to condense the volatiles recovered thereby, comprising the steps of flashing a heat-plastified stream of polymeric material in a first flash devolatilization zone to remove the majority of the volatiles; flashing the partially devolatilized polymeric material in at least one additional flash devolatilization zone maintained at a lower pressure than the pressure of the first zone, preferably as low as practically possible, to remove residual volatiles; feeding the volatile constituents recovered in the additional flash zones into the first flash zone; and, then recovering the combined free volatiles present in the first flash zone for further use by condensing the volatiles in a non-refrigerated cooling process. The pressure within the first flash zone is generally maintained at a reduced pressure which is sufficient to remove a major portion of the volatile constituents, but is sufficiently high that the volatiles withdrawn therefrom may be condensed in a conventional, non-refrigerated condenser, such as, for example, a condenser having cooling water circulating therethrough. The pressure in the additional flash devolatilization zones is generally maintained at a reduced pressure lower than the pressure in the first flash zone, and preferably as low as practically possible in order to obtain as complete devolatilization of the polymeric material as possible. By feeding the volatiles separated in the additional flash zones back into the first flash zone, the volatiles may thus be readily condensed in a conventional non-refrigerated cooling process without the necessity for refrigeration.

As used herein, the term "non-refrigerated cooling process" is used to mean those cooling processes where a coolant, such as water, is simply circulated through a cooling apparatus without the inclusion of a refrigerating system. The present invention thus contemplates that any conventional cooling process in which the coolant is simply circulated in heat-exchange relationship with the volatiles may be utilized herein. Moreover, any coolant well known to those skilled in the art may also be utilized. However, due to its low cost and availability water is the preferred coolant for use in the instant invention.

According to another aspect of the present invention, there is provided an apparatus for use in the above-defined devolatilization process. Broadly, this apparatus comprises a multiple-stage flash devolatilization system comprising a first flash devolatilization zone maintained at a reduced pressure, and at least one additional devolatilization zone maintained at a pressure lower than the pressure of the first flash zone, and a primary source of vacuum connected to the condenser of the first flash devolatilization zone for maintaining a vacuum within the system. A secondary vacuum booster is provided on each of the additional flash zones in order to maintain the lower pressures, preferably as low as practically possible, which are desired therein, and to convey the volatiles separated in the additional flash zones back into the relatively higher pressure first flash zone. By employing a secondary vacuum booster to deliver the volatiles separated in the additional flash zones into the relatively higher pressure first flash zone, the necessity for a separate refrigerated condenser in order to condense the volatiles separated in each of these zones is eliminated. A single conventional, non-refrigerated condenser may, therefore, be provided on the primary vacuum line to condense the combined free volatiles present in the first flash zone. Also provided are heating means for preheating the polymeric material prior to entering the devolatilization zones, and means for feeding the polymeric material from each flash zone. Preferably, these feeding means comprise gear pumps or extruders adapted to operate under vacuum. In another preferred embodiment of the instant invention, moreover, the feeding means may also include a heating and/or mixing means in order to maintain the temperature of the polymeric material above its softening point.

Through the use of the process and apparatus of the instant invention, the volatiles content of polymers may be reduced to very low levels with improved economy. Since refrigeration is no longer required to condense the volatiles separated in the lower pressure devolatilization zones, the use of optimally low pressures therein, resulting in an enhanced reduction of volatile constituents, is rendered economically viable.

Further objects, features, and advantages of the present invention will become apparent to the skilled artisan upon examination of the following detailed description of the present invention, taken in conjunction with the accompanying figure of drawing.

BRIEF DESCRIPTION OF THE DRAWING

The attached FIGURE is a schematic diagram of one embodiment of the process and apparatus of the instant invention, wherein a three-stage devolatilization system is employed, comprising a first flash devolatilization zone maintained at a reduced pressure sufficient to enable the volatiles separated therein to be condensed in a conventional non-refrigerated condenser, and two lower pressure devolatilization zones maintained at a pressure optimal for maximum volatiles separation.

DETAILED DESCRIPTION OF PREFERRED EMBODIMENTS

Figure 1:
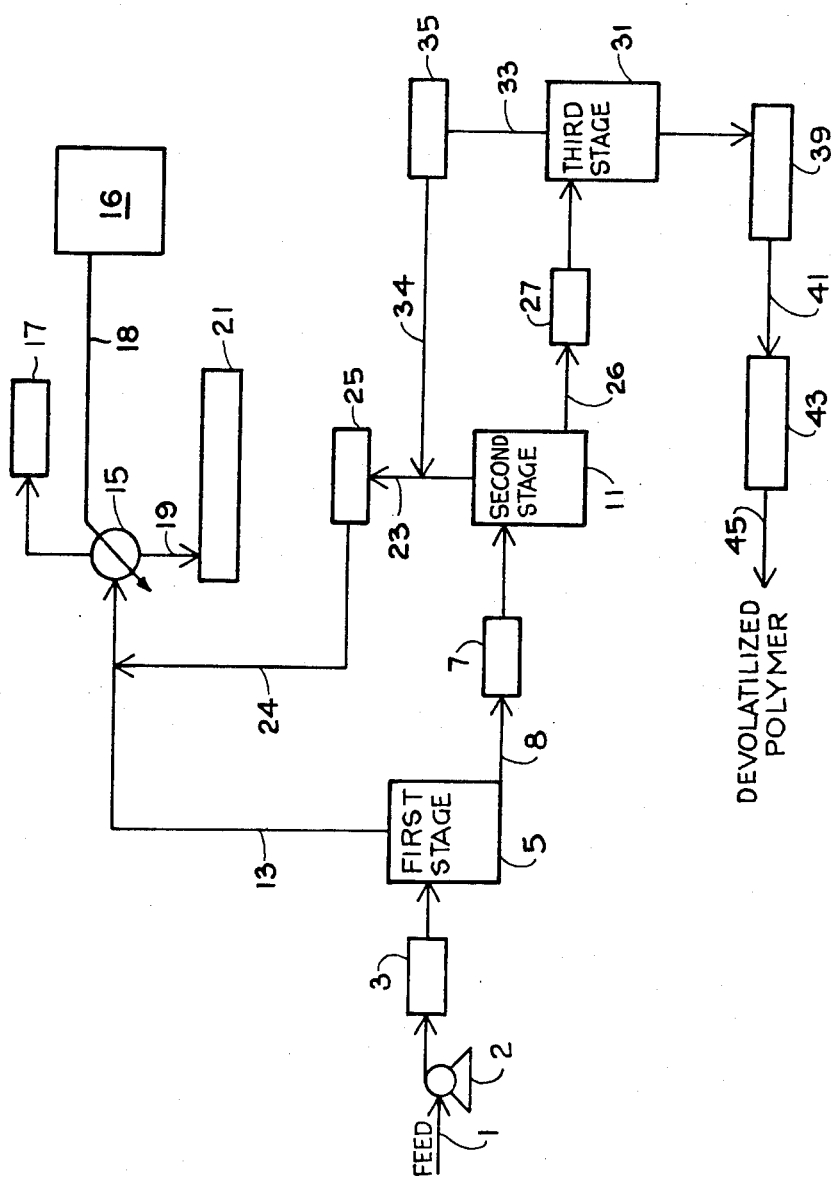

In order to obtain maximum separation of volatile constituents from mass processable polymers, it is necessary that the heat-plasticized polymer be exposed to as low pressures as are practically possible. Heretofore, however, the use of such optimally low pressures in the processes of the prior art has required the use of refrigeration in order to condense the volatile constituents separated thereby, with an attendant undesirable increase in the cost of the process. Applicants have found, though, that the aforementioned problems with the processes of the prior art can be overcome by utilizing a multiple-stage flash devolatilization system comprising a first flash zone maintained at a reduced pressure sufficiently low to remove a major portion of the volatile constituents, but at a sufficiently high pressure to enable the volatiles present therein to be readily condensed by a conventional non-refrigerated condenser, and at least one additional flash devolatilization zone maintained at a lower pressure optimal for maximum volatiles separation, wherein the volatiles separated in the additional flash zones are recycled back into the first relatively higher flash zone for condensing with the volatiles separated therein. By thus returning the volatiles separated in the additional lower pressure flash zones to the first flash zone, the relatively higher pressure, and the lower cooling requirement necessary in view thereof, may be employed for condensing the volatiles separated in the additional low pressure flash zones, completely eliminating the need for expensive refrigeration.

For many commercial applications, the volatiles present in the polymeric material may be reduced to the desired level through the use of only a single additional lower pressure flash zone. However, for other commercial applications, such as, for example, food packaging, the volatiles must be reduced to extremely low levels. In this situation, in accordance with another embodiment of the present invention, devolatilization may be enhanced by reheating the partially devolatilized polymer produced in the preceding flash zone to a temperature significantly above its softening point but below the point of appreciable degradation before subjecting it to the optimally low pressure flashing. Moreover, enhanced volatiles removal may also be obtained by employing a plurality of optimally decreasing pressure flashing zones, with or without the additional provision of intermediate reheating steps therebetween. By employing multiple sequences of reheating steps and optimally, ever lower pressure flash devolatilization steps, the volatiles content of the polymeric material may be reduced to any desired level.

In one particularly preferred embodiment of the instant invention, when a polymeric material having a very low volatiles content is required, a three-stage flash devolatilization system, comprising a first relatively higher, reduced pressure flash zone, and two optimally low pressure flash zones of increasingly lower pressures, are employed with a reheating step intermediate between the second and third flash devolatilization stages. Optionally, a reheating step may also be employed intermediate between the first and second flash devolatilization steps. Through the use of such a system, applicants have found that the volatiles content of the polymeric materials may be reduced to less than 0.1% by weight volatiles or less. By enabling the volatiles to be reduced to such low levels, the instant invention thus accrues an additional advantage in that a finished polymer product having improved physical properties may be economically produced.

Any thermoplastic polymeric material which is extrudable in mass form may be successfully devolatilized in accordance with the inventive concepts of the instant invention. Accordingly, the invention is applicable not only to those polymers which are conventionally polymerized in mass form, but additionally to those polymers which require other processes for their preparation but which can be extruded in mass form. By way of example, but not of limitation, the instant invention is suitable for use with polyolefin polymers and copolymers such as polyethylene, polypropyelene, polybutylene; acrylate polymers and copolymers, such as, polyacrylonitrile, polymethacrylate polymers, alkyl methacrylate polymers; vinyl halide polymers and copolymers, such as, vinyl chloride polymers, vinylidene chloride polymers; vinyl aromatic monomer polymers and copolymers, such as, polystyrene, styrene-acrylonitrile copolymers, styrene-rubber polymer copolymers, styrene-rubbery polymer-acrylonitrile copolymers, and styrene-rubbery polymer-mecharcylate copolymers, etc.

While any of these types of polymers can be processed according to the present invention, regardless of their mode of preparation, in one preferred embodiment of the instant invention, the polymeric material will comprise a polymer which is polymerizable in mass form, and will most preferably comprise the homopolymers and copolymers of vinyl aromatic monomers, such as, for example, polystyrene, rubber-modified polystyrenes, SAN copolymers, ABS copolymers, polymethacrylates, and styrene-rubbery polymer-methacrylate terpolymers. Since polystyrene and rubber-modified styrene copolymers are most frequently polymerized in mass form, these polymers comprise the most preferred materials for devolatilization by the instant process.

As used herein, the term "vinyl aromatic monomers" is used in a generic sense and refers to any of the vinyl aromatic, styrene-like compounds well known in the art, such as styrene, alkyl-substituted styrenes, halogen substituted styrenes, and other derivatives thereof that are free from nuclear substituents which interfer with the production of the desired vinyl aromatic polymers. Specific examples of such vinyl aromatic compounds include alkyl styrenes, such as, o-ethyl-styrene, para-methyl styrene, meta-methyl styrene, para-ethyl styrene, para-isopropyl styrene; halo styrenes, such as, 2,3-dichloro styrene, ortho-chloro styrene, para-chloro styrene, aryl-dichloro styrene, para-fluoro styrene, para-bromo styrene; and, aryl-substituted styrenes, such as, aryl-dimethyl styrene and mixtures thereof. Likewise, the rubber polymer utilized in the rubber-modified styrene polymers most preferred for devolatilization according to the instant invention may comprise any of those polymerized dienes known in the art to be suitable for the preparation of rubber-modified styrene polymers. By way of illustration, but not of limitation, examples of suitable rubber polymers to be used in the instant invention include the rubber homopolymers and copolymers of butadiene, such as butadiene, butadiene-styrene, butadiene-acrylonitrile, butadiene-methacrylonitrile, and terpolymers, such as, butadiene-styrene-methacrylonitrile terpolymers. Other examples of suitable rubbers include polyisoprene, polypiperylene, poly-2,3-dimethyl butadiene, polyisobutylene, polychloroprene, polycyclopentadiene, natural rubbers, chlorinated rubber, acrylic rubbers, copolymers of styrene with isobutylene, and copolymers of butadiene with isobutylene, although polybutadiene and styrene-butadiene rubbery polymers are most frequently employed as the rubber polymer.

The thermoplastic polymeric materials to be devolatilized in accordance with the instant invention may be produced by any polymerization method well known to those skilled in the art. Processes for the polymerization of these type of polymers have been extensively developed in the prior art, and any suitable method described therein may be used for the preparation thereof. Generally, the polymeric materials devolatilizable by the process of the instant invention may be prepared according to the mass, suspension, solution, emulsion, mass-suspension, or vapor phase techniques. As long as these polymers are "mass processable", i.e., capable of being converted to a mass extrudable condition, they can be devolatilized according to the present invention. As has been aforementioned, the mass polymerized materials are particularly suitable for devolatilization according to the instant invention. The mass polymerization technique is well known to those skilled in the art and any suitablye method may be employed for the preparation of this type of polymer. A particularly preferred mass polymerization process is the continuous mass polymerization process described in U.S. Pat. No. 3,945,976, the entirety of which is herein incorporated by reference.

Referring now to the drawing, there is disclosed a preferred embodiment of the instant invention suitable for use where a very low volatiles content is required, comprising a three-stage flash devolatilization system having optional reheating steps intermediate between each flashing step. A suitable stream of volatile-containing polymeric material enters through line 1 and is conveyed by a polymer gear pump or extruder 2 through the heater 3 wherein the temperature of the polymeric material is increased to at least a temperature above the softening point of the polymer but below a point where significant degradation occurs. The specific temperature to which the feed polymer is heated will vary from polymer to polymer. For the polystyrene and rubber-modified styrene copolymers, which are the preferred polymeric materials for use in the instant process, the polymer feed will be heated to a temperature within the range of from about 240° to 260° C., and preferably from about 250° to 260° C. The speed of the forwarding device 2, as well as that of the forwarding devices 7, 27, and 39, is adjusted so as to move the material forward as fast as it enters so as to prevent the level rising in any devolatilizer stage.

The polymeric feed is next passed by the pumping action of the pump 2 to the first stage flash devolatilization zone 5. The first flash zone 5, as has been aforementioned, is maintained at a pressure which is sufficiently low to remove a major portion of the volatile constituents from the polymeric feed, but is sufficiently high that the volatiles separated therein may be condensed without the use of refrigeration in a conventional condenser 15. The pressure within the first flash zone 5 will generally be maintained by the primary vacuum source 17 within the range of from about atmospheric pressure to approximately 25 mm, depending upon the available condensing temperature of the coolant utilized in the condenser, preferably from about 30 to 50 mm, and most preferably from about 30 to 40 mm.

The flash devolatilizer 5, as well as the second and third flash devolatilizer 11 and 31, may be of any suitable construction well known to those skilled in the art for most polymers; however, certain halide containing polymers may require non-corrosive construction or coating material, as is also well known to those skilled in the art. Conventionally, the devolatilizers will be of the jacketed, oil-heated type in order to maintain the temperature therein approximately equivalent to the temperature of the polymer flowing therethrough. Moreover, it is also preferred that the devolatilizers include a dispersing device near the inlet of the flash devolatilizers in order to increase the surface area of the heat-plastified polymer. Such devices are well known by those skilled in the art, and any suitable dispersing means may be employed. Examples of suitable devices include distribution pipes having small holes therein which separate the heat-plastified polymer into strands, plates having slots therein which convert the molten polymer into thin sheets, and other types of plates wherein the polymer is spread out into a very thin, large surface area form.

The volatiles separated from the polymeric material flowing through the first stage devolatilizer 5 are withdrawn by primary vacuum source 17 through line 13 to condenser 15. The condenser 15 may be of any conventional construction, and is preferably of the non-refrigerated type wherein a suitable coolant is passed in heat-exchange relationship with the gaseous volatiles. The condenser 15 may use any suitable coolant, such as, for example, water, brine, hydrocarbon oils, alcohols, water-alcohol azeotropes, liquid mercury, etc. However, due to its extremely low cost and high heat transfer coefficient, water is the preferred coolant, although where more efficient cooling is desired or where water is unavailable, any other conventional coolant may be employed. In the preferred embodiment utilizing water as the coolant, it is obtained directly from a conventional source 16 of plant cooling water via line 18. As indicated above, the source of cooling water is non-refrigerated, i.e., does not utilize mechanical refrigeration. The volatiles condensed in the condenser 15 are withdrawn through line 19 to accumulator 21 wherein they are stored for subsequent use, such as, for example, for recycle to a polymerization zone or for discard.

As a result of the elevated temperature of the polyermic material and the reduced pressure in the flash zone 5, a partially devolatilized polymeric material is produced which is conveyed by forwarding device 7 to the lower pressure flash zone 11. Gear pumps suitable for this purpose are well known to those skilled in the art and need not be described herein in detail. Any conventional gear pump adapted for operation under vacuum is suitable for conveying the partially devolatilized polymeric material to the low pressure flash zone 11. Alternatively, an extruder adapted for operation under vacuum may also be employed. In accordance with a preferred embodiment of the instant invention, the forward device 7 may optionally consist of a heater-extruder for increasing the temperature of the polymeric material to a temperature at least above its softening point, in order to improve the fluidity of the polymeric material, and to enhance the devolatilization thereof.

The pressure within the second flash zone 11 is usually maintained at a pressure below the pressure in the first flash zone 5 in order to enable a further fraction of volatiles to be separated from the polymeric material. Preferably, however, the pressure in the second and subsequent devolatilization zones is maintained at decreasing low levels in order to provide a pressure therein optimal for maximum volatiles separation. For maximum volatiles removal, the pressure in the second flash zone 11 will be maintained within the range of from about 5 mm to 10 mm.

In order to maintain the pressure within the second flash zone at this low value, a secondary vacuum booster or air pump 25 is provided on line 23 which evacuates the devolatilizer 11 to its lower pressure, and withdraws the volatiles present therein for return to the higher pressure of the first flash zone 5 by introduction into line 13 on the way to condenser 15, via line 23.

After flashing in the second flash devolatilization zone 11, the volatiles content of the polymeric material will ordinarily have been reduced sufficiently to meet most commercial requirements. The resulting devolatilized polymeric material will then be fed by a suitable forwarding device to a polymer finishing apparatus, wherein the polymer is pelletized into the finished polymer product. Where even greater reduction in the volatiles content is required, however, one or more additional low pressure flash devolatilization steps, together with an optional reheating step preparatory thereto, may be employed.

In the embodiment shown in the accompanying drawing, the further devolatilized polymeric material produced in the second flash zone 11, is conveyed through line 26 by forwarding device 27, and is subjected to a third flash devolatilization in the flash devolatilization zone 31. In the third devolatilization zone, the pressure is reduced to a still lower level by the use of a third vacuum booster 35 pulling by line 33 on devolatilizer 31 and exhausting into line 23, the slightly higher pressure of devolatilizer 11. In this third flash zone 31, a final fraction of volatiles is separated and is returned via line 33 by a secondary vacuum booster 35 to the second flash zone and from this through 23 and 25 to subsequent condensation in the condenser 15 in accordance with the principles of the instant invention. The secondary vacuum booster 35, as well as the secondary vacuum booster 25, comprises a conventional vacuum booster which evacuates flash zone 31 down to the lower pressures which are desirable for use therein, by exhausting into the pressure level of the second stage and therefore pulling a still better vacuum.

Where three or more flash devolatilization steps are employed, the pressure is incrementally decreased from the first flash zone to the last flash zone, with the pressure in the lower pressure flash zones being adjusted to values within the ranges set forth above for the second flash zone 11. In the preferred embodiment, however, it is preferred that in the second flash zone 11 and each subsequent flash zone, such as, the flash zone 31, the pressure within each of these zones be maintained as low as practically possible, typically within the range of from about 5 mm to 1 mm, since the use of such pressures in the low pressure flash steps enables maximum separation of the volatile constituents from the polymeric material.

After passage through the third flash zone 31, the volatiles content will have been reduced sufficiently to enable use of the polymeric material in the overwhelming majority of commercial applications, including those applications requiring a very pure polymer, such as, for example, in food packaging. The substantially completely devolatilized polymeric material is then conveyed by forwarding device 39 via line 41 to the finishing zone 43. The finishing zone 43 may comprise a pelletizer. The finished polymer, in the form of pellets, is then withdrawn through line 45 for its ultimate commercial use.

While the instant invention has been described with reference to the embodiment shown in the accompanying drawing, the present invention also contemplates that certain variations, obvious to those skilled in the art, may also be employed therein. For example, a heater-extruder may be substituted for the forwarding device 2 and heater 3.

While the invention has thus been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A multi-stage vacuum flash devolatilization apparatus for removing volatiles from a thermoplastic polymer material comprising a mass processable polymer containing said volatiles to produce a polymeric material containing less than about 0.1% by weight of volatiles, said apparatus comprising:
    (a) means for heating said thermopalstic polymeric material to a temperature at least above its softening point but below its degredation temperature;
    (b) a first flash devolatilization zone connected for receiving polymeric material from said heating means;
    (c) means for maintaining said first flash devolatilization zone at a first sub-atmospheric pressure sufficient to vaporize and remove a major portion of said volatiles from said polymeric material but which is above the pressure at which mechanical refrigeration is needed to condense the vaporized volatiles, whereby there can be produced in said first flash devolatilization zone a partially devolatilized thermoplastic polymeric material;
    (d) means for withdrawing a first stream of vaporized volatiles at said first sub-atmospheric pressure from said first flash devolatilization zone;
    (e) a second flash devolatilization zone;
    (f) means for feeding said partially devolatilized thermoplastic polymeric material to said second flash devolatilization zone;
    (g) means for maintaining said second flash devolatilization zone at a second sub-atmoshperic pressure which is below about 5 mm Hg and said first sub-atmospheric pressure of said first flash devolatilization zone and which is sufficient to vaporize and remove the remaining amount of said volatiles from said polymeric material to produce a finally devolatilized thermoplastic polymeric material containing less than about 0.1% by weight of volatiles;
    (h) means for withdrawing a second stream of vaporized volatiles at said second sub-atmospheric pressure from said second flash devolatilization zone;
    (i) means for feeding the second stream of volatiles from said second flash devolatilization zone into the first stream of volatiles withdrawn from said first flash devolatilization zone, to produce a combined stream of volatiles at said first sub-atmospheric pressure;
    (j) means defining a source of cooling water which supplies said cooling water at a temperature which is sufficiently low to condense the combined stream of volatiles at said first sub-atmospheric pressure;
    (k) means, comprising a condenser, for condensing the combined stream of volatiles at said first sub-atmospheric pressure by contacting said combined stream with a heat transfer surface which has been cooled by said cooling water; and
    (l) means for supplying cooling water from said water source means to said condenser whereby said means defining said source of water, said condenser and said cooling water supply means lacks any means for mechanical refrigeration.

2. An apparatus according to claim 1, wherein said means for heating said polymeric material comprises an extruder.

3. An apparatus according to claim 1, wherein said second flash devolatilization zone is the final devolatilization zone.

4. An apparatus according to claim 1, wherein each of said flash devolatilization zones contains means therein for dispersing and increasing the surface area of said polymeric material.

5. An apparatus according to claim 1, further comprising means for mass polymerizing said polymeric material, said mass polymerizing means being located upstream of said first flash devolatilization zone for supplying volatile-containing mass polymerized polymer thereto.

6. An apparatus according to claim 1, wherein said means for maintaining said first flash devolatilization zone at said first sub-atmospheric pressure comprises means for maintaining a pressure between atmospheric pressure and about 25 mm Hg.

7. An apparatus according to claim 6, wherein said means for maintaining said first flash devolatilization zone at said first sub-atmospheric pressure comprises means for maintaining a pressure a pressure within the range of from about 30 to 50 mm Hg.

8. An apparatus according to claim 1, wherein said means for feeding said partially devolatilized polymeric material to said second flash devolatilization zone comprises an extruder adapted to operate under vacuum.

9. An apparatus according to claim 8, wherein said feeding means comprises a mixer-heat transfer device adapted for operation under vacuum for reheating said polymeric material to a temperature at least above its softening point prior to entering said second flash zone.

* * * * *